United States Patent [19]
Prast

[11] 4,159,710
[45] Jul. 3, 1979

[54] SOLAR COLLECTOR COMPRISING SOLAR TRACKING MEANS

[75] Inventor: Gijsbert Prast, Eindhoven, Netherlands

[73] Assignee: U.S. Philips Corporation, New York, N.Y.

[21] Appl. No.: 824,273

[22] Filed: Aug. 15, 1977

[30] Foreign Application Priority Data

Sep. 20, 1976 [NL] Netherlands ............... 7610401

[51] Int. Cl.² ................................. F24J 3/02
[52] U.S. Cl. ........................ 126/271; 126/270; 136/89 PC
[58] Field of Search ............ 126/270, 271; 250/203; 353/3; 350/289; 136/89 PC

[56] References Cited
U.S. PATENT DOCUMENTS

| 3,273,558 | 9/1966 | Boothe | 126/271 |
| 3,861,379 | 1/1975 | Anderson, Jr. | 126/271 |
| 4,063,543 | 12/1977 | Hedger | 126/270 |
| 4,089,323 | 5/1978 | Trihey | 126/270 |

Primary Examiner—Carroll B. Dority, Jr.
Assistant Examiner—Larry Jones
Attorney, Agent, or Firm—Thomas A. Briody; William J. Streeter; Rolf E. Schneider

[57] ABSTRACT

A solar collector includes a plurality of elongate parallel reflectors mounted for rotation about their respective longitudinal axes, together with mechanism coupled to the reflectors for simultaneously rotating the same. An elongate absorber is arranged parallel to the reflectors for collecting solar radiation focussed thereon by the reflectors. Tracking means including two solar sensor reservoirs containing a vaporizable/condensible liquid working medium is provided for rotation of the reflectors to control the focussing of solar radiation on the absorber.

13 Claims, 4 Drawing Figures

SOLAR COLLECTOR COMPRISING SOLAR TRACKING MEANS

This invention relates to a solar collector, comprising a focussing reflector system which is formed by a plurality of elongate, mutually parallel reflectors which are mounted on a frame to be rotatable about their longitudinal axes, said reflectors being coupled to an adjusting mechanism for rotation of the individual reflectors, an elongate absorber which is arranged parallel to the reflectors and which serves to collect solar radiation concentrated thereon by the reflectors, and solar tracking means responsive to solar radiation and which operates the adjusting mechanism in order to maintain focussing of solar radiation on the absorber.

A solar collector of the described kind is known from U.S. Pat. No. 3,861,379.

In the known solar collector the solar tracking means comprises a photoelectric device which is coupled, via an electromagnetic device (motor), to the adjusting mechanism.

A second photoelectric device is provided in order to interrupt, in the case of cloudy skies, the rotation signal for the electromagnetic device which originates from the first photoelectric device, thus preventing rotation of the reflectors.

A timer which is actuated at the end of the day ensures that the motor returns the reflectors to the morning position.

A solar tracking system of this kind is complex and expensive.

The present invention has for its object to provide a universally usable, independently operating solar collector comprising solar tracking means having a very simple and inexpensive construction.

To this end, the solar collector in accordance with the invention is characterized in that the solar tracking means comprises two elongate sensor reservoirs which are situated opposite the reflectors and which extend, viewed from the reflector system, at least substantially on different sides of the absorber relative to each other, each reservoir having one end which is situated in the immediate vicinity of the absorber and each reservoir containing a working medium which is partly in the liquid phase and partly in the vapour phase during operation, the vapour pressure of said working medium being proportional, due to an evaporation/condensation process, to the quantity of solar radiation received from the reflectors by the relevant reservoir, the two working medium pressures acting on the adjusting mechanism in a mutually opposed sense, so that the differential pressure which occurs in the case of a deviation of the focussing on the absorber corrects the position of the reflectors for said deviation.

A preferred embodiment of the solar collector in accordance with the invention is characterized in that the reservoir ends in the immediate vicinity of the absorber are situated, viewed from the reflector system, in front of the absorber in the path of solar rays focussed on the absorber.

This means that in the correct position of the reflectors, each of the two reservoirs receives an equal signal corresponding to a given amount of solar radiation originating from the reflectors. This offers the advantage that, in the case of defocussing due to movement of the sun, not only the signal applied to the one reservoir increases, but also that the signal applied to the other reservoir decreases to the same extent, so that a large differential signal is obtained which results in a large working medium differential pressure.

A preferred embodiment of the solar collector in accordance with the invention is characterized in that each reservoir is connected to the adjusting mechanism via a duct which contains a pressure transfer medium.

The transfer of pressure may be hydraulic or pneumatic.

In a further preferred embodiment of the solar collector in accordance with the invention, each duct is coupled to the adjusting mechanism via a bellows which also contains a pressure transfer medium.

The pressure transfer medium in each case may be the working medium. This results in a very simple construction, because no movable partitions are required between the media in each reservoir, duct and bellows system.

A still further preferred embodiment of the solar collector in accordance with the invention is characterized in that the inner walls of each reservoir are provided with a capillary structure for the transport of liquid working medium.

The capillary structure ensures that working medium condensate condensed on colder reservoir wall parts is returned to the reservoir wall which faces the reflectors and which serves as a vaporizer. Because condensate is then also returned against the force of gravity, greater freedom exists with regard to the arrangement of the reservoirs which need no longer be horizontally arranged.

The capillary structure also ensures uniform wetting of the vaporizer/reservoir wall, so that notably boiling dry and hence overheating of the vaporization wall is precluded.

In another preferred embodiment of the solar collector in accordance with the invention, the outer surfaces of the reservoir walls facing the reflectors are provided with a black layer having an absorption factor $\alpha \geq 0.9$ for solar radiation.

The solar radiation ($\lambda = 0.3$–$2$ microns) incident on a reservoir is thus substantially absorbed.

The outer surfaces of the reservoir walls which are remote from the reflectors may be constructed so as to be reflective.

Thus, solar radiation directly incident on said remote surfaces does not disturb the signal originating from the reflectors.

In order to further increase the sensitivity of the reservoirs the reservoirs may be accommodated in an evacuated, transparent envelope.

The two reservoirs may be accommodated in separate envelopes or in one and the same envelope.

Because of the reduction of heat losses achieved by means of the evacuated envelope, an incident signal then results in a larger temperature difference between the two sensors and hence in a larger differential pressure between the two working media.

In accordance with the invention, the part of the envelope which is remote from the reflectors may be provided with a reflective layer. This constitutes a separate or, besides the already indicated possibility, an additional possibility of shielding the surfaces of the reservoirs remote from the reflectors against direct incidence of solar radiation.

The sensitivity of the reservoirs can be further increased by providing the inner surface of the envelope with a light-transmitting but infrared-reflective layer.

The heat radiation emitted by the reservoirs is then reflected again to these reservoirs, which results in larger differences in the working medium temperatures, and hence in the working medium pressures, prevailing in the two reservoirs.

The working medium may be a volatile organic compound, for example, a substance known under the trade name "Freon" such as $CCl_3F$. A substance of this kind has the desired boiling point in the active temperature range of the system.

By way of illustration the invention will now be described in more detail with reference to the accompanying diagrammatic drawing, in which.

Figure 1:
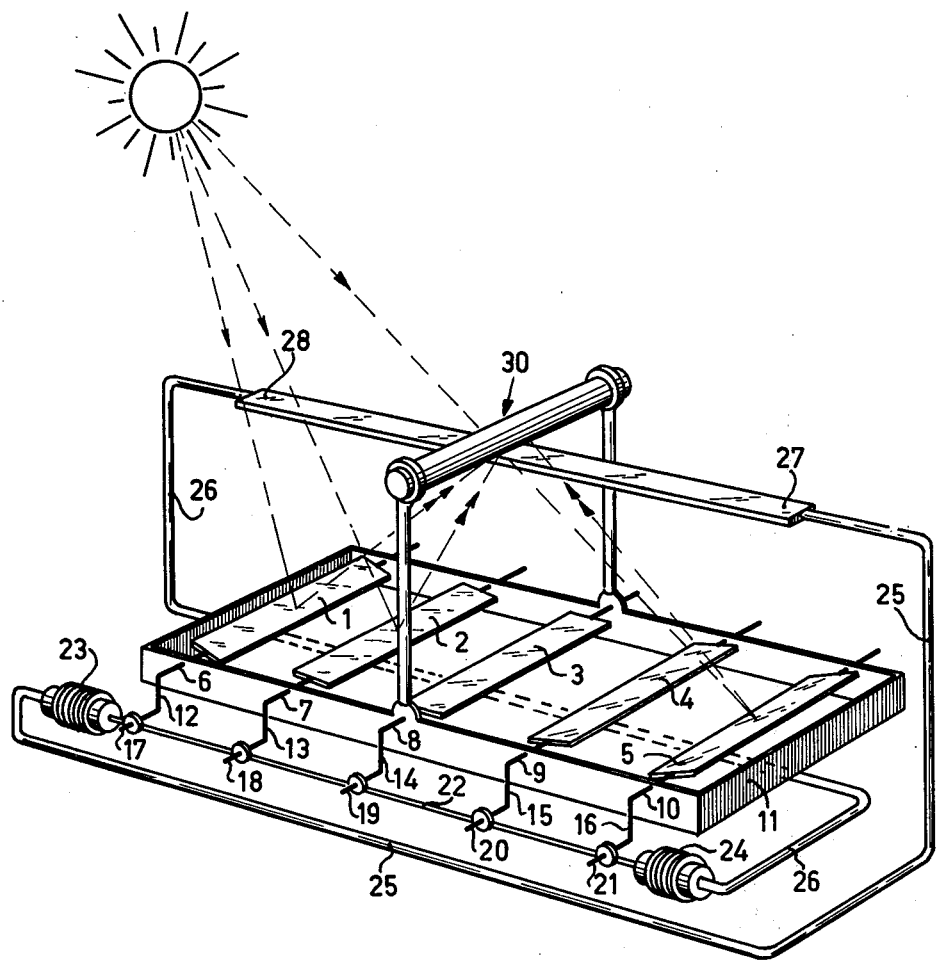
FIG. 1 is a perspective view of a solar collector comprising a solar tracking system which includes sensors in the form of two vapour pressure reservoirs.

The reference numerals 1 to 5 in FIG. 1 denote elongate reflectors. Obviously, an arbitrary number of reflectors may be chosen. The reflectors 1 . . . 5 are mounted to be rotatable about their longitudinal axes 6 to 10 on a frame 11. The shafts 6–10 are rigidly connected to rods 12–16 which are pivotably connected to a rod 22 via pins 17–21.

Figure 2:
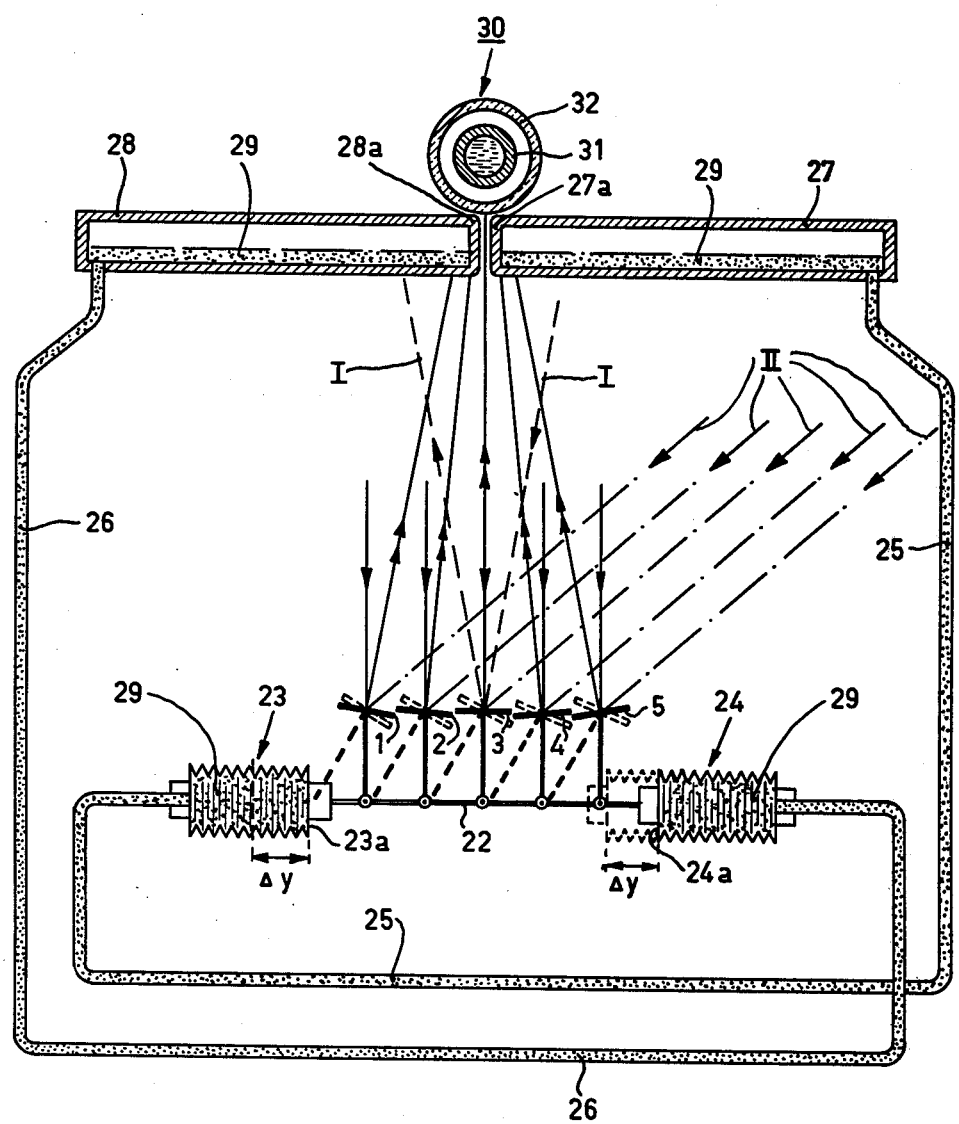
FIG. 2 shows on an enlarged scale the solar collector of FIG. 1 in a sectional view transversely of the longitudinal axis of the absorber.

On both ends of the rod 22 bellows 23 and 24 are connected respectively, each of which is in open communication, via a capillary duct 25, 26, respectively, with a tubular reservoir 27, 28, respectively. The reservoirs 27 and 28 contain a working medium which is partly in the liquid phase and partly in the vapour phase during operation, while the capillary ducts 25 and 26 and the bellows 23 and 24 are completely filled with liquid working medium 29 (FIG. 2). Trichloromonofluoromethane ($CCl_3F$) for example, is a very suitable working medium.

A tubular absorber 30 is rigidly arranged above the reflectors 1–5 and parallel thereto, said absorber comprising an inner tube 31 (FIG. 2) wherethrough a medium to be heated, for example, water or oil, can be conducted via an inlet duct and an outlet duct (not shown), and also comprising an evacuated transparent outer tube 32 which is made, for example, of (quartz) glass.

The reservoirs 27 and 28 are arranged above the reflectors 1–5, in the present case horizontally in a plane perpendicularly to the longitudinal axis of the absorber 30. The facing reservoir ends 27a and 28a are situated in front of the absorber 30, viewed from the reflectors 1–5.

The operation of the solar tracking system will be described hereinafter. For the sake of clarity, a situation is assumed (FIG. 2) where, for substantially perpendicularly incident solar radiation, denoted by full lines with one arrow, the reflectors 1–5 are symmetrically arranged and adjusted relative to the absorber 30 (reflectors represented by non-interrupted lines) so that the radiation reflected by the reflectors (non-interrupted lines with two arrows) is concentrated on the inner tube 31 of the absorber 30, equal, small parts of the total quantity of focussed radiation being intercepted by the ends 27a and 28a of the reservoirs 27 and 28. The energy applied, via the reservoir ends 27a and 28a, to the liquid 29 in the reservoirs 27 and 28 causes evaporation of part of this liquid. Equal vapour pressures then prevail in the reservoirs 27 and 28, said vapour pressures acting to the same extent but in the opposite direction on the rod 22 via the liquid in the ducts 25 and 26 and the bellows 23 and 24. Thus, the rod 22 remains in the central position shown.

When the sun moves in the direction from A to B (FIG. 2), the radiation is no longer perpendicularly incident but, for example, as denoted by the dotted ray I. If the position of the reflector 3 is not changed, the reflected ray I is no longer incident on the absorber 30, but to the left thereof (in FIG. 2). This implies that the light spot incident on the reservoirs 27 and 28 moves in the direction from B to A; in other words, less solar radiation is incident on the reservoir 27 and more solar radiation is incident on the reservoir 28. Consequently, the vapour pressure in the reservoir 27 decreases and the vapour pressure in the reservoir 28 increases.

The resultant differential pressure causes the rod 22 and the bellows 23, 24 to be displaced to the left over a distance $\Delta y$. The reflectors 1–5 are then rotated so that the solar radiation is again concentrated on the absorber 30.

If the solar radiation is incident as denoted by the dotted lines II, the reflectors 1–5 occupy the positions denoted by broken lines, the reflected rays again being focussed on the absorber 30. Generally, for an angular rotation $\alpha$ of the incident solar radiation, each reflector is subjected to an individual angular rotation $\frac{1}{2}\alpha$.

When the sun moves in the direction from B to A, the opposite effect occurs.

The light spot incident on the reservoirs 27 and 28 then moves from left to right in FIG. 2, with the result that the vapour pressure in the reservoir 27 increases and that in the reservoir 28 decreases. The rod 22 is then displaced to the right.

The volume of the reservoirs 27 and 28 is dependent on the active surface areas 23a, 24a, respectively, and on the total displacement distance of the bellows.

This volume should notably be slightly larger than the product of the active bellows surface area and the total bellows displacement distance. The reservoirs then always remain filled with liquid, which is necessary in order to maintain the inverse proportionality of temperature and working medium pressure.

The reservoirs 27 and 28 in FIGS. 1 and 2 are horizontally arranged in the plane perpendicularly to the longitudinal axis of the absorber. The horizontally arranged reservoirs, however, may also enclose an angle other than 90° with the longitudinal axis of the absorber. Moreover, the reservoir ends which are situated near the absorber need not necessarily be adjacently arranged, but may also be shifted relative to each other in the direction of the longitudinal axis of the absorber, with or without overlapping of the absorber.

In order to ensure, in the case of horizontally arranged reservoirs, that radiation reflected by the reflectors at sunrise is already incident on a reservoir, the reservoirs must be constructed to be comparatively long.

Figure 4:
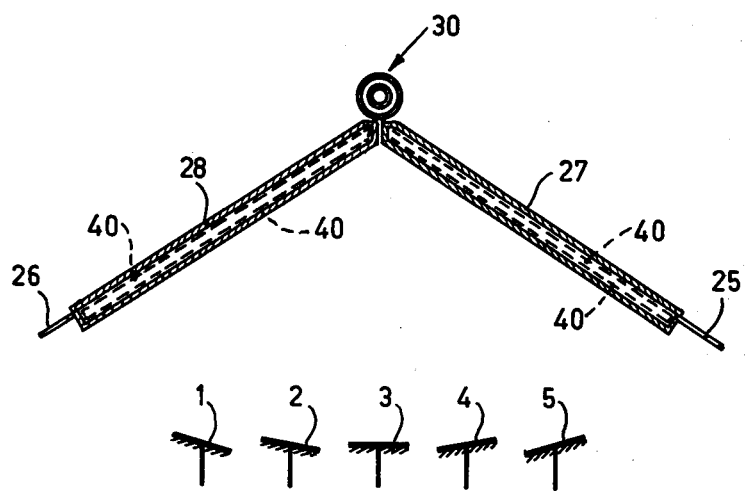
FIG. 4 shows in principle an arrangement of the vapour pressure reservoirs which deviates from that shown in FIG. 2.

The reservoir length can be reduced by arranging the reservoirs at an angle relative to each other, bent towards the reflectors. This is illustrated in FIG. 4. Obviously, the reservoirs themselves may also have a curved construction. In order to ensure that the vaporization walls of the reservoirs 27 and 28 which face the reflectors 1–5 are always completely covered with a layer of liquid, the inner surfaces of these reservoirs are provided with a capillary structure 40, for example, in the form of a fine-meshed gauze, or with grooves in the walls. Not only vapour condensed on colder reservoir wall parts is then returned to the vaporization wall by capillary forces, utilizing the surface tension of the condensate, but this wall also remains uniformly wetted.

Figure 3:
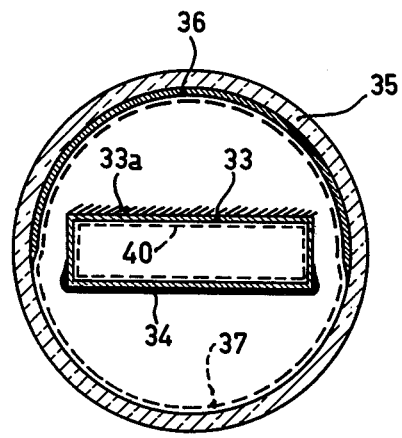
FIG. 3 is a cross-sectional view of an embodiment of a vapour pressure reservoir which serves as a sensor.

The capillary structure 40 is also shown in the cross-sectional view of the embodiment of a vapour pressure reservoir sensor shown in FIG. 3. Therein, the capillary structure 40 is arranged in a flat reservoir 33 the lower surface of which, facing the reflectors during operation, is provided with a black surface layer 34 having a high absorption factor for solar radiation, for example, a layer of nickel oxide or copper oxide or copper sulphide, it also being possible for said layer to have a low emission factor for heat radiation. The incident solar radiation is thus more effectively used for the vaporization of working medium.

The reservoir 33, being made of, for example, glass or metal, is accommodated in an evacuated transparent envelope 35, of, for example, glass or a transparent plastics material in order to further reduce the heat losses.

The upper half cylinder of the envelope 35 is provided on its inner surface with a reflective layer 36, for example, an aluminium mirror, whereby notably solar radiation incident directly from above on the reservoir 33, likely to cause an interference signal, is intercepted.

In addition, the reservoir 33 may also be constructed to be reflective on its upper outer surface, for example, by polishing if the reservoir is made of metal.

Finally, the entire inner surface of the envelope 35 is provided with a light-transmitting but infrared-reflective layer 37, of, for example, indium oxide or tin oxide. Thus, the heat radiation emitted by the layer 34 is reflected again to this layer.

Even though the described solar tracking means is extremely suitable for the present type of solar collector, comprising a stationary absorber and a reflector system consisting of a plurality of reflectors, because the forces exclusively required for rotation of the reflectors are small and hence the dimensions of the solar tracking means are also very small, obviously, application for other types of solar collectors is also possible, for example, for collectors having one large rotatable reflector constructed as a parabolic trough, or for collectors comprising a rotating absorber with or without a moving mirror system, etc. For the latter categories of collectors, however, the attractiveness of the solar tracking means in accordance with the invention is reduced because the large forces required for adjustment would require large dimensions for these solar tracking means.

What is claimed is:

1. A solar collector, which comprises a plurality of elongate, mutually parallel individual reflectors mounted on a frame for rotation about their respective longitudinal axes, an adjusting mechanism coupled to the individual reflectors for simultaneously rotating the same, an elongate absorber arranged parallel to the individual reflectors and serving to collect solar radiation focussed and concentrated thereon by the reflectors, and tracking means responsive to solar radiation for operating the adjusting mechanism, said tracking means including two elongate sensor reservoirs positioned opposite the reflectors and extending, when viewed from the reflectors, at least substantially on different sides of the absorber relative to each other, one end of each reservoir being situated in the immediate vicinity of the absorber, a vaporizable/condensible working medium partly in the liquid phase and partly in the vapour phase in each reservoir, the vapour pressure of said working medium in each reservoir being proportional during operation to the quantity of solar radiation received from the reflectors by the respective reservoirs, and means to enable the two working medium vapour pressures to act on the adjusting mechanism in mutually opposed senses to correct the focussing of solar radiation by the reflectors on the absorber in accord with any differential working medium vapour pressure.

2. A solar collector according to claim 1, in which the respective reservoir ends in the immediate vicinity of the absorber are situated in front of the absorber in the path of solar radiation focussed on the absorber.

3. A solar collector according to claim 2, in which the two reservoirs are arranged horizontally with respect to the reflectors and perpendicularly with respect to a plane including the longitudinal axis of the absorber.

4. A solar collector according to claim 2, in which the two reservoirs are downwardly inclined at an angle with respect to each other.

5. A solar collector according to claim 1, in which the enabling means includes ducts connecting the respective reservoirs to the adjusting mechanism, each duct containing a pressure transfer medium.

6. A solar collector according to claim 5, in which each duct includes a bellows also containing a pressure transfer medium.

7. A solar collector according to claim 6, in which the pressure transfer medium is comprised by liquid working medium.

8. A solar collector according to claim 1, in which the surfaces of the inner walls of the reservoirs are provided with a capillary structure for the transport of liquid working medium.

9. A solar collector according to claim 1, in which the outer surfaces of the reservoir walls facing the reflectors are provided with a black layer having an absorption factor $\alpha \geq 0.9$ for solar radiation.

10. A solar collector according to claim 1, in which the outer surfaces of the reservoir walls remote from the reflectors are constructed to be reflective.

11. A solar collector according to claim 1, in which the reservoirs are accommodated in an evacuated, transparent envelope.

12. A solar collector according to claim 11, in which the part of the envelope remote from the reflectors is provided with a reflective layer.

13. A solar collector according to claim 11, in which said envelope has an inner surface on which is provided a light-transmitting but infrared-reflective layer.

* * * * *